United States Patent
Greitschus

[19]

[11] Patent Number: 6,166,526
[45] Date of Patent: Dec. 26, 2000

[54] DC/DC CONVERTER

[75] Inventor: Norbert Greitschus, Freiburg, Germany

[73] Assignee: Micronas Intermetall GmbH, Freiburg, Germany

[21] Appl. No.: 09/272,508

[22] Filed: Mar. 19, 1999

[30] Foreign Application Priority Data

Mar. 20, 1998 [DE] Germany .................... 198 12 299

[51] Int. Cl.[7] .............................. G05F 1/10; G05F 1/40
[52] U.S. Cl. ........................ 323/222; 323/282; 327/534
[58] Field of Search ......................... 323/222, 282, 323/267, 284, 315; 363/21; 327/534

[56] References Cited

U.S. PATENT DOCUMENTS

| | | |
|---|---|---|
| 4,260,946 | 4/1981 | Wheatley, Jr. . |
| 4,584,517 | 4/1986 | Schwob .................... 323/222 |
| 5,892,389 | 4/1999 | Lai ........................... 327/543 |
| 5,914,589 | 6/1999 | Erckert ..................... 323/282 |
| 5,959,439 | 9/1999 | Shenai et al. ............ 323/222 |

FOREIGN PATENT DOCUMENTS

| | | |
|---|---|---|
| 0 650 250 A1 | 8/1994 | European Pat. Off. . |
| 37 04 609 A1 | 2/1987 | Germany . |
| 7-110721 | 4/1995 | Japan . |

OTHER PUBLICATIONS

Siefart, "Analoge Schaultungen", VEB Verlag Technik Berlin, pp. 540–547, 1987 No Month.

*Primary Examiner*—Shawn Riley
*Assistant Examiner*—Rajnikant B. Patel
*Attorney, Agent, or Firm*—Arthur L. Plevy; Buchanan Ingersoll PC

[57] ABSTRACT

A DC/DC converter including a switching transistor, an inductor, a smoothing capacitor, and a switching element which are connected so as to convert an input voltage $U_E$ to an output voltage $U_A$ greater or less than the input voltage $U_E$. The current through the inductor can be measured by providing a comparator having a first input connected to the switching transistor, and a second input connected to a reference transistor and a reference current source so as to fix the switching threshold of the comparator at the second input.

19 Claims, 3 Drawing Sheets

DC/DC CONVERTER

FIELD OF THE INVENTION

This invention relates to DC/DC converters and more particularly to a DC/DC converter adapted to convert an input voltage to an output voltage greater or less than the input voltage.

BACKGROUND OF THE INVENTION

DC/DC converters are known from "Analoge Schaltungen", M. Seifert, VEB Verlag Technik Berlin, 1987, pp. 540 et seq. A DC/DC converter can be designed as a step-up converter, which produces an output voltage greater than the input voltage, or as a step-down converter, which produces an output voltage less than the input voltage. Such a DC/DC converter has a high efficiency. The ratio of output voltage to input voltage is determined by the duty cycle of the switching transistor.

An inductor serves as an energy store in the DC/DC converter. It generally consists of a coil with a ferrite core. In such a DC/DC converter, the inductor current is a function of the load current. When the inductor current exceeds a given value, the ferrite material quickly loses its permeability since the inductor becomes saturated, whereby a further increase in current is caused, which may result in the circuit or parts thereof being destroyed.

From data sheet MAX 731, MAXIM Integrated Products, Sunnyvale, Calif., USA, a DC/DC converter is known in which the inductor current is measured via a sensing resistor in series with the switching transistor. This makes it possible to measure any unwanted increase in inductor current and prevents a destruction of parts of the circuit.

This arrangement has the disadvantage that the sensing resistor must be large enough to produce a sufficient voltage drop for a precise current measurement. Hence, the efficiency of the DC/DC converter is reduced, since in the on state, the resistance of the switching transistor is increased by the sensing resistor. Viewed from this standpoint, a sensing resistor of zero resistance would be desirable.

Accordingly, it is an object of the present invention to provide a DC/DC converter in which the inductor current can be monitored without reducing the efficiency of the DC/DC converter.

SUMMARY OF THE INVENTION

A DC/DC converter including a switching transistor (1), an inductor (2), a smoothing capacitor (3), and a switching element (4) which are connected so as to convert an input voltage $U_E$ to an output voltage $U_A$ greater or less than the input voltage $U_E$. The current through the inductor can be measured by providing a comparator (5) having a first input connected to the switching transistor (1), and a second input connected to a reference transistor (7) and a reference current source (6) so as to fix the switching threshold of the comparator (5) at the second input.

DETAILED DESCRIPTION OF THE INVENTION

Figure 1:
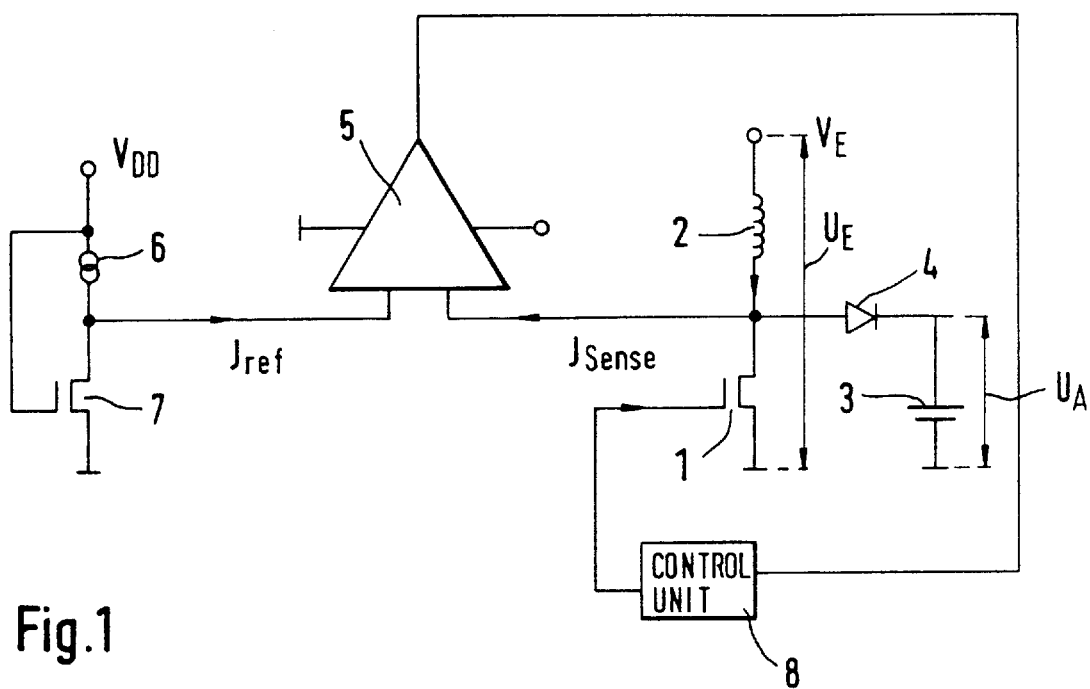
FIG. 1 illustrates a first embodiment of the DC/DC converter according to the present invention as a step-up converter.

This object is attained by a DC/DC converter which includes a comparator having a first input connected to the switching transistor, and a second input connected to a reference transistor and a reference current source in such a way as to fix the switching threshold of the comparator at the second input.

With this arrangement, the inductor current can be measured without an additional sensing resistor being required, so as not to reduce the operating efficiency of the DC/DC converter. Since, in the on state, the switching transistor is operated in its resistance region or triode region, the inductor current can be measured via the voltage drop across the switching transistor. In the circuit according to the invention, the voltage drop across the switching transistor is compared with the voltage drop across the reference transistor. The latter voltage drop is caused by the fact that the reference current from the reference current source flows through the reference transistor. This determines the switching threshold of the comparator. The switching threshold will be chosen so that the maximum permissible current through the inductor or the switching transistor will be detected.

When the maximum permissible current through the switching transistor is reached, the voltage at the first input of the comparator becomes equal to the voltage at the second input of the comparator. At this current and in case of a further increase in current, the comparator changes to its other state. Thus, the comparator senses when the current in the DC/DC converter exceeds the maximum permissible value.

In a preferred embodiment of the invention, the switching transistor and the reference transistor are MOS transistors, the reference transistor is operated as a triode transistor, and in the on state of the switching transistor, the ratio of the gate-source voltage of the switching transistor to the gate-source voltage of the reference transistor is constant. This ensures that comparable conditions exist for the reference transistor and the switching transistor, so that the current through the switching transistor can be determined more reliably. Advantageously, the ratio of the gate-source voltages of the two transistors is 1. The reference transistor advantageously has a smaller width to length (w/l) ratio than the switching transistor. The w/l ratio of the transistors determines their parameters. As a result of the smaller w/l ratio of the reference transistor, a reference current smaller than the current through the switching transistor is needed, whereby any unnecessarily high current in the reference circuit is avoided.

Advantageously, the output of the comparator is applied to a control unit for controlling the duty cycle of the switching transistor. The output of the comparator thus acts on the control of the DC/DC converter. If the current through the switching transistor exceeds the predetermined maximum value, the duty cycle of the switching transistor is changed so that the output voltage, and thus the current through the DC/DC converter, changes.

In another embodiment of the invention, the reference transistor comprises several series-connected, like transistors whose gate electrodes are tied to a common, fixed potential. In the case of a step-up converter, the fixed potential may be the operating voltage; in the case of a step-down converter, it may be ground. In this arrangement, in order to achieve a predetermined reference voltage for the second input of the comparator, the reference current is reduced by a factor equal to the number of transistors. A high reference voltage is thus obtained. Further, because the voltage drops across the individual transistors are small, the resulting back-bias effect of the transistors is negligible.

In a further embodiment of the invention, a first auxiliary switching element is provided between the first input of the comparator and the switching transistor for separating the comparator input from the switching transistor during the off state of the switching transistor. The auxiliary switching element prevents the comparator from being overdriven when the switching transistor is turned off. By the auxiliary switching element, the line from the switching transistor to the input of the comparator is separated. The auxiliary switching element can be implemented with a transistor. A second auxiliary switching element may be provided between the first input of the comparator and a fixed potential. Thus, when the line between the switching transistor and the comparator is opened by the first auxiliary switching element, the first input of the comparator is held at a fixed potential. Any undefined voltage at the comparator input is thus prevented.

In the case of a step-up converter, the first input of the comparator is preferably grounded; in the case of a step-down converter, it is preferably connected to the operating voltage. Thus, by means of the first and second auxiliary switching elements, the comparator input is prevented from being cyclically overdriven.

The reference current source may be designed to be adjustable from outside. The reference current may be adjustable digitally, i.e., in steps, or continuously, for example by means of a potentiometer.

The comparator may have a predetermined offset voltage. This permits a further shift of the switching threshold of the comparator. The reference voltage can be increased without using too many transistors for forming the measuring transistor and without the reference current being increased.

Further, the comparator may exhibit hysteresis, i.e., it may be designed as a Schmitt trigger.

Advantageously, the arrangement is implemented using monolithic integrated circuit technology. The reference transistors can then be disposed near the switching transistor, so that comparable conditions exist for the two transistors and no matching problems are caused by excessive spacing, masking differences, differences in implementation, temperature, and the like.

The invention will now be explained in more detail with reference to the accompanying drawings, wherein like references refer to like elements of the invention.

FIG. 1 illustrates a first embodiment of the DC/DC converter according to the present invention as a step-up converter. It serves to convert an input voltage $U_E$ to an output voltage $U_A$ which is greater than the input voltage $U_E$. The DC/DC converter comprises a switching transistor 1, an inductor 2, a smoothing capacitor 3, and a switching element 4 in the form of a diode. For the switching transistor 1, an n-channel MOS transistor is used here. Instead of MOS transistors, bipolar transistors can be used in this circuit. The input voltage is applied across the series combination of the inductor 2 and the switching transistor 1 such that the source terminal of the switching transistor 1 is grounded.

The smoothing capacitor 3 and the switching element 4 are connected in parallel with the source-drain direction of the switching transistor 1. The circuit is designed so that the current through the inductor 2 can be measured in the on state of the switching transistor 1. In its on state, the switching transistor 1 is operated in the linear region, i.e., in the triode region. Therefore, the voltage drop across the switching transistor 1 is nearly proportional to the current through the inductor 2. The voltage drop across the switching transistor 1 is applied to the first input of a comparator 5. The other input of the comparator 5 is connected to a reference voltage. The latter is generated by applying a reference current from a reference current source 6 to a reference transistor 7. The reference transistor 7 is also an n-channel MOS transistor which is operated in its linear region, i.e., in the triode region. In the on state of the transistors, the ratio of the gate-source voltage of the switching transistor 1 to the gate-source voltage of the reference transistor 7 is constant. The reference transistor 7 is basically of the same design as the switching transistor 1. However, it can have a smaller width/length (w/l) ratio than the switching transistor 1.

Thus, with a reference current which is substantially smaller than the current through the inductor 2, the reference transistor 7 can produce the same voltage drop as the voltage drop at the first input of the comparator 5. The reference current source 6 and the reference transistor 7 are chosen so that a predetermined reference voltage is generated which corresponds to the voltage at the switching transistor caused by the maximum permissible current through the inductor 2. When the current through the inductor 2 exceeds the predetermined value, the voltage at the first input of the comparator 5 rises above the reference voltage at the second input of the comparator 5, so that the state of the output signal of the comparator changes. Thus, it is determined by means of the output signal of the comparator 5 that the current through the inductor 2 exceeds a predetermined value.

In the embodiment shown, the output of the comparator 5 is applied to a control unit 8 which controls the gate of the switching transistor 1. With the control unit 8, the duty cycle of the switching transistor 1 can be controlled directly. Since the duty cycle determines the ratio of output voltage $U_A$ to input voltage $U_E$, the output voltage can thus be readjusted in case of changes in input voltage. An increase in the current through the inductor 2 can be counteracted by controlling the duty cycle. At too high an inductance current, the output signal of the comparator 5 causes the duty cycle of the switching transistor 1 to be reduced, thereby reducing the output voltage and, thus, the inductor current.

This circuit does not require an additional sensing resistor to sense the current through the switching transistor. Hence, the efficiency of the DC/DC converter is retained. The entire arrangement of FIG. 1 can be integrated on a semiconductor, particularly on a silicon substrate. The reference transistor 7 is disposed close to the switching transistor 1, so that comparable conditions exist for the two transistors. Thus, temperature effects as well as influences of the manufacturing process, such as dissimilar implementation, mask alignment processes, etc., are avoided.

Figure 2:
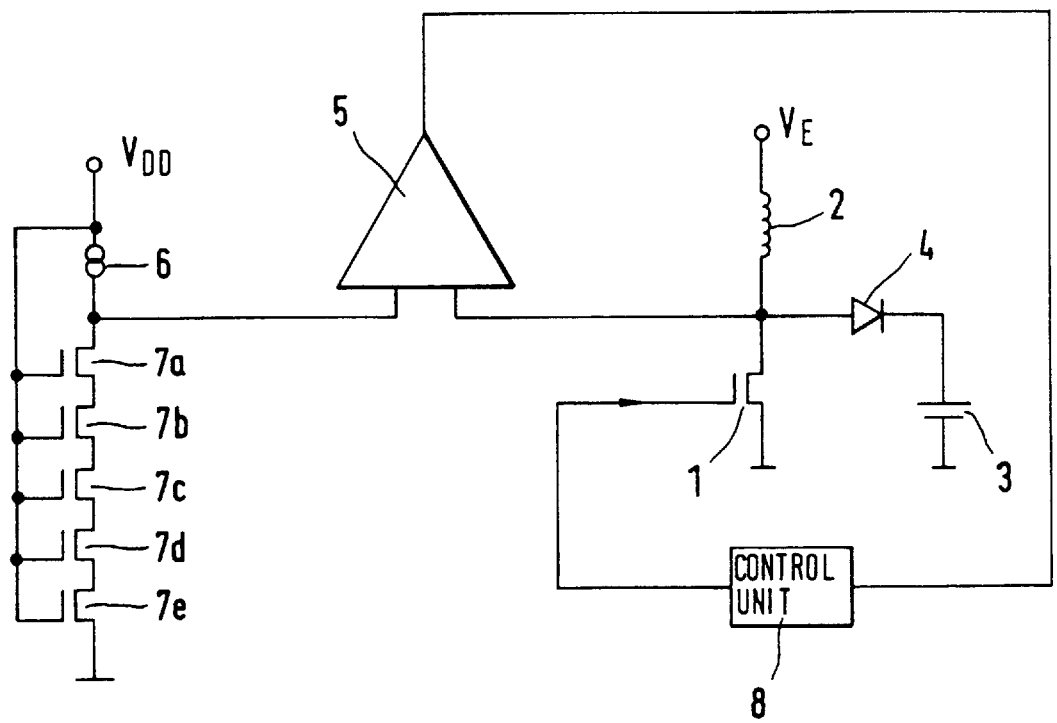
FIG. 2 illustrates another embodiment of the DC/DC converter according to the present invention as a step-up converter.

FIG. 2 illustrates another embodiment of the DC/DC converter according to the present invention as a step-up converter. Like parts are designated by the same reference characters as in the embodiment of FIG. 1. Since the operation of the circuit corresponds to that of the embodiment of FIG. 1, only the differences will be discussed.

The reference transistor is formed from several like transistors 7a, 7b, 7c, 7d, 7e connected in series. The gate electrodes of these transistors are tied to a common, fixed potential, the operating voltage. In this manner, a substantially higher reference voltage for comparison with the voltage at the first input of the comparator 5 can be generated without having to produce a large reference current. Through the series combination of the transistors 7a, 7b, 7c, 7d, 7e, a large voltage drop can be detected without producing a large voltage drop in the individual transistors.

Figure 3:
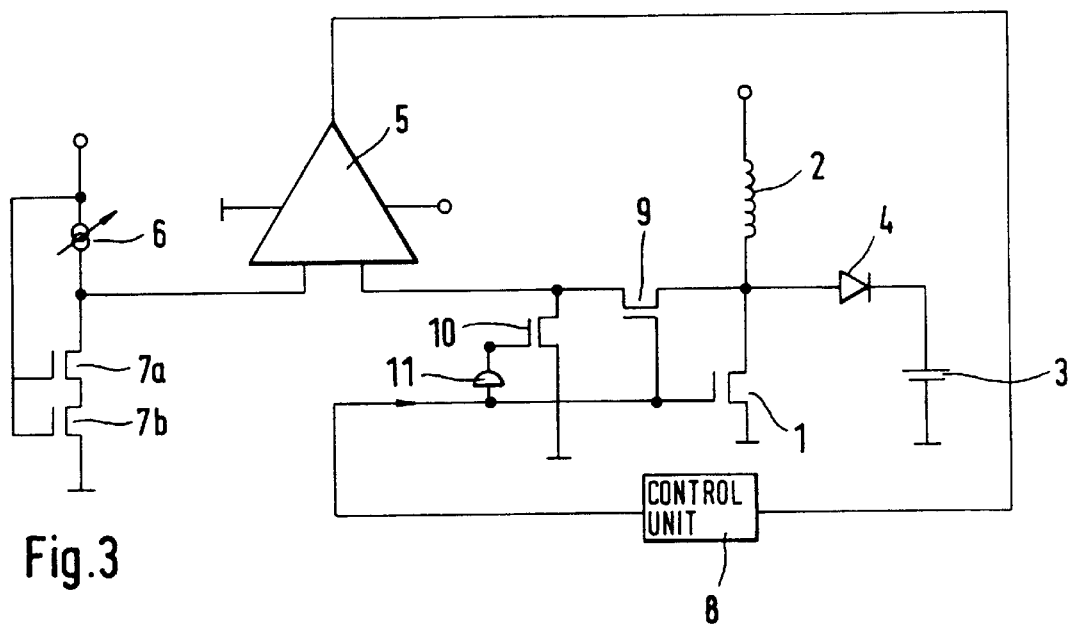
FIG. 3 illustrates another embodiment of the DC/DC converter according to the present invention as a step-up converter.

Referring now to the embodiment of FIG. 3, the reference transistor is implemented with two transistors 7a, 7b. The reference current of the reference current source 6 is variable. An external current may be impressed as the reference current. The current source is continuously adjustable, for example by means of a potentiometer.

Connected between the first input of the comparator 5 and the switching transistor 1 is a first auxiliary switching element 9 which separates the comparator input from the switching transistor 1 during the off state of the switching transistor 1. The first auxiliary switching element 9 is an n-channel MOS transistor. It prevents the comparator 5 from being overdriven when the switching transistor 1 is switched to the off state. Since the first auxiliary switching element 9 separates the line from the switching transistor 1 to the comparator 5, no increased voltage can reach the first input of the comparator. Connected between the first input of the comparator 5 and a fixed potential is a second auxiliary switching element 10 which holds the first input at the fixed potential during the off state of the switching transistor 1. In this embodiment, the second auxiliary switching element 10 is also implemented as an n-channel MOS transistor. It causes a fixed potential to be applied to the first input of the comparator 5 when the line from the switching transistor 1 to the comparator 5 is separated by the first auxiliary switching element 9. Floating of the voltage at the first comparator input is thus prevented. Here, the first comparator input is grounded. The gate of the second auxiliary switching element 10 is connected through an inverter 11 to the clock signal of the switching transistor 1. This causes the second auxiliary switching element 10 to be turned off when the first auxiliary switching element 9 and the switching transistor 1 are turned on.

Figure 4:
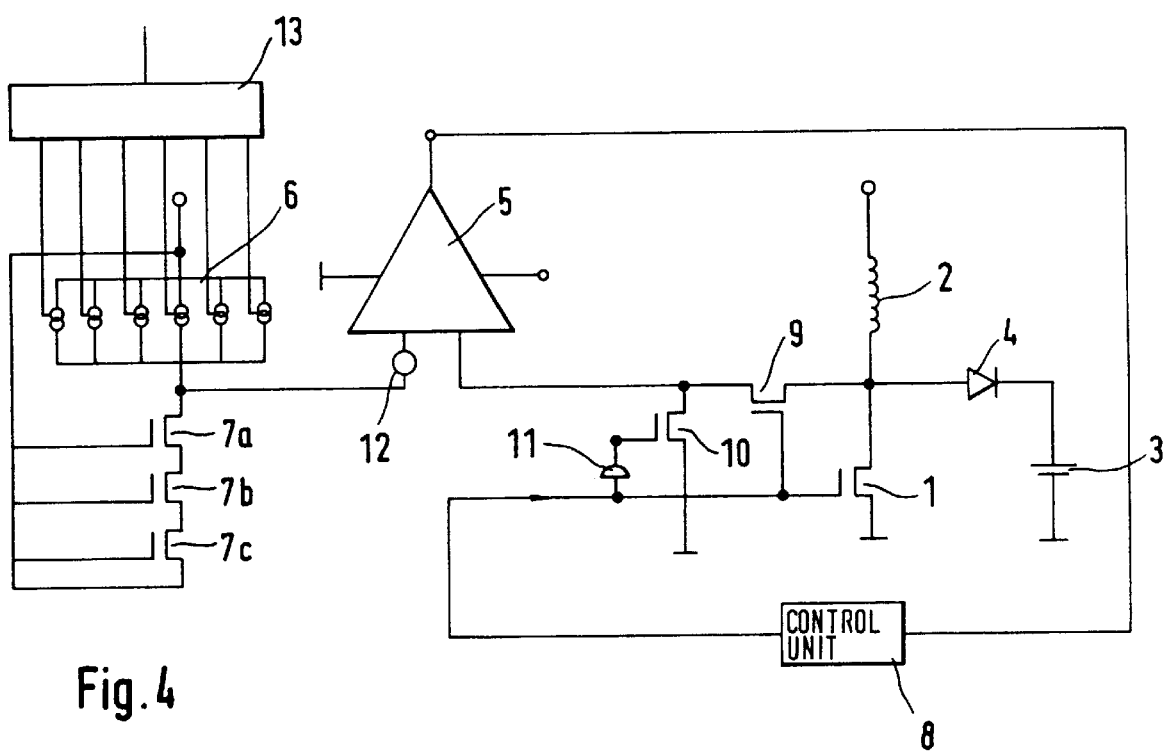
FIG. 4 illustrates another embodiment of the DC/DC converter according to the present invention as a step-up converter.

Referring now to the embodiment of FIG. 4, therein is illustrated an embodiment in which the circuit connected to the first comparator input is identical to the corresponding circuit of FIG. 3, so that it need not be described again. However, the reference current source 6 in this embodiment is digitally adjustable. The digital register 13 of the reference current source 6 can be adjusted via a digital interface, for example. The reference transistor comprises transistors 7a, 7b, 7c. The comparator 5 is provided with an offset voltage 12. This allows the reference voltage to be further increased without the reference transistor 7 having to comprise further transistors and without a high reference current having to flow through the reference transistor 7. In this embodiment, the comparator 5 is a voltage comparator.

Figure 5:
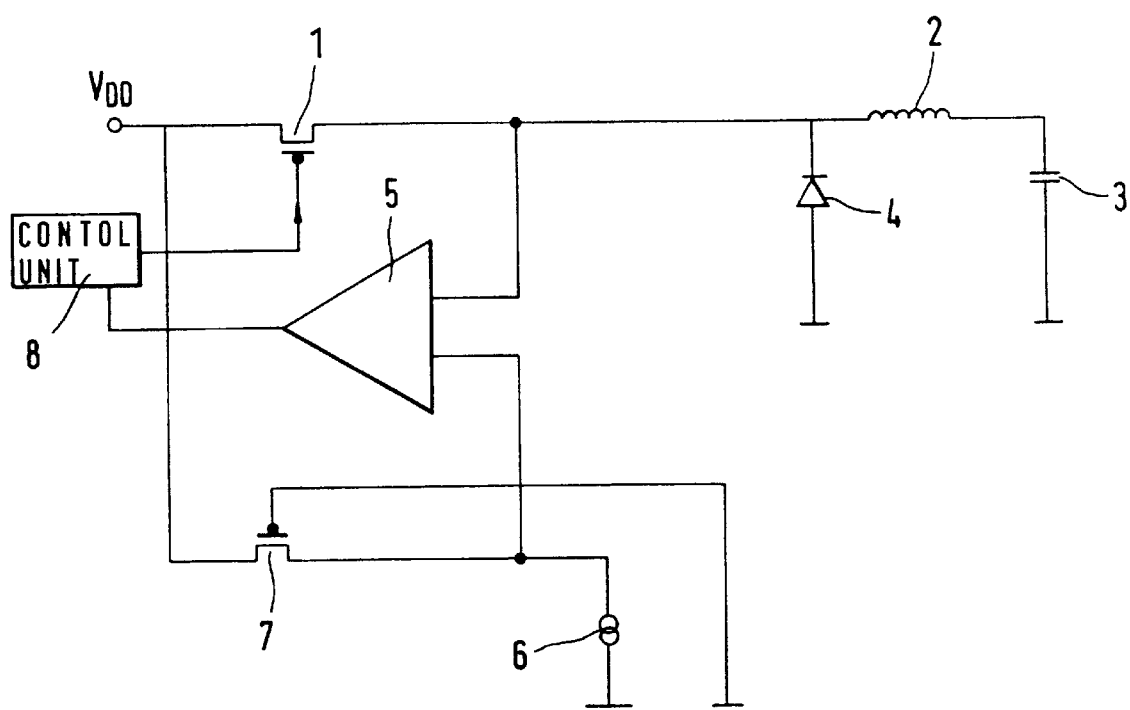
FIG. 5 illustrates an embodiment of the DC/DC converter according to the present invention as a step-down converter.

Referring now to FIG. 5, therein is illustrated an embodiment of the DC/DC converter as a step-down converter according to the present invention. The current-monitoring principle corresponds to that of FIG. 1. Again, like elements are designated by like reference characters and act in the same manner.

Instead of n-channel MOS transistors, p-channel MOS transistors are used for the switching transistor 1 and the reference transistor 7. Accordingly, the ground connection and the terminal for the operating voltage $V_{DD}$ have been interchanged. Modifications of the reference transistor 7 and the reference current source 6 and the insertion of the auxiliary switching elements 9 and 10 are possible analogously to FIGS. 2, 3 and 4.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A DC/DC converter comprising a switching transistor (1), an inductor (2), a smoothing capacitor (3), and a switching element (4) which are connected so as to convert an input voltage $U_E$ to an output voltage $U_A$ greater or less than the input voltage, and a comparator (5) having a first input connected to the switching transistor (1), and a second input connected to a reference transistor (7) and a reference current source (6) so as to fix a predetermined switching threshold of the comparator (5) at the second input, wherein the switching transistor (1) and the reference transistor (7) are MOS transistors, the reference transistor (7) is operated in a triode region, and, in the on state of the switching transistor (1), the ratio of a gate-source voltage of the switching transistor to a gate-source voltage of the reference transistor (7) is constant.

2. The DC/DC converter of claim 1, wherein the reference transistor (7) has a smaller width/length ration than the switching transistor (1).

3. The DC/DC converter of claim 1, wherein the output signal of the comparator (5) is fed to a control unit (8) for controlling the duty cycle of the switching transistor (1).

4. The DC/DC converter of claim 1, wherein the reference transistor (7) comprises several series-connected, like transistors (7a, 7b, 7c, 7d, 7e) whose gates are tied to a common, fixed potential.

5. The DC/DC converter of claim 1, wherein a first auxiliary switching element (9) is provided between the first input of the comparator (5) and the switching transistor (1) for separating the comparator input from the switching transistor (1) during the off state of the switching transistor.

6. The DC/DC converter of claim 5, wherein a second auxiliary switching element (10) is provided between the first input of the comparator (5) and a fixed potential for holding the first input at the fixed potential during the off state of the switching transistor (1).

7. The DC/DC converter of claim 1, wherein the reference current source 6 is adjustable.

8. The DC/DC converter of claim 1, wherein the comparator (5) has a predetermined offset voltage.

9. The DC/DC converter of claim 1, wherein the comparator (5) exhibits hysteresis.

10. The DC/DC converter of claim 1, wherein the arrangement is implemented using monolithic integrated circuit technology.

11. A DC/DC converter comprising:
a switching transistor (1);
an inductor (2) coupled to said switching transistor (1);
a smoothing capacitor (3);
a switching element (4) coupled between said smoothing capacitor (3) and switching transistor (1) so as to convert an input voltage $U_E$ to an output voltage $U_A$ greater or less than the input voltage;

a reference transistor (7);

a comparator (5) having a first input connected to the switching transistor (1) and inductor (2), and a second input connected to said reference transistor (7); and, a reference current source (6) also coupled to said second input of said comparator (5) to fix a predetermined switching threshold of the comparator (5) at the second input.

12. The DC/DC converter of claim 11, wherein:

the switching transistor (1) and the reference transistor (7) are MOS transistors;

the reference transistor (7) is adapted to be operated in a triode region; and, in the on state of the switching transistor (1), the ratio of a gate-source voltage of the switching transistor (1) to a gate-source voltage of the reference transistor (7) is substantially constant.

13. The DC/DC converter of claim 11, wherein the reference transistor (7) has a smaller width/length ratio than the switching transistor (1).

14. The DC/DC converter of claim 11, further comprising a control unit (8) having an input coupled to an output of the comparator (5), and being adapted to control a duty cycle of the switching transistor (1).

15. The DC/DC converter of claim 11, wherein the reference transistor (7) comprises several series-connected, like transistors (7a, 7b, 7c, 7d, 7e) whose gates are tied to a common, fixed potential.

16. The DC/DC converter of claim 11, wherein a first auxiliary switching element (9) is provided between the first input of the comparator (5) and the switching transistor (1) for separating the comparator input from the switching transistor (1) during an off state of the switching transistor.

17. The DC/DC converter of claim 16, wherein a second auxiliary switching element (10) is provided between the first input of the comparator (5) and a fixed potential for holding the first input of the comparator (5) at the fixed potential during the off state of the switching transistor (1).

18. The DC/DC converter of claim 11, wherein the comparator (5) has a predetermined offset voltage.

19. The DC/DC converter of claim 11, wherein the comparator (5) exhibits hysteresis.

* * * * *